United States Patent
Leete, III (10) Patent No.: US 9,538,138 B2
(45) Date of Patent: Jan. 3, 2017

(54) SYSTEM FOR PROVIDING ACCESS TO SHARED MULTIMEDIA CONTENT

(71) Applicant: Puddle Innovations, Spring Lake, MI (US)

(72) Inventor: Lawrence F. Leete, III, Spring Lake, MI (US)

(73) Assignee: Puddle Innovations, Spring Lake, MI (US)

( * ) Notice: Subject to any disclaimer, the term of this patent is extended or adjusted under 35 U.S.C. 154(b) by 219 days.

(21) Appl. No.: 14/296,842

(22) Filed: Jun. 5, 2014

(65) Prior Publication Data

US 2014/0362161 A1 Dec. 11, 2014
US 2015/0319408 A9 Nov. 5, 2015

Related U.S. Application Data

(60) Provisional application No. 61/831,423, filed on Jun. 5, 2013, provisional application No. 61/842,628, filed on Jul. 3, 2013, provisional application No. 61/842,638, filed on Jul. 3, 2013.

(51) Int. Cl.
*H04N 7/14* (2006.01)
*H04N 7/15* (2006.01)
*H04W 4/00* (2009.01)

(52) U.S. Cl.
CPC .............. *H04N 7/152* (2013.01); *H04W 4/00* (2013.01); *H04W 4/008* (2013.01)

(58) Field of Classification Search
CPC .......... H04N 7/15; H04N 7/147; H04N 7/152; H04N 7/155; H04N 7/142
USPC ................................ 348/14.01, 14.08, 14.09
See application file for complete search history.

(56) References Cited

U.S. PATENT DOCUMENTS

| | | |
|---|---|---|
| 7,142,812 B1 | 11/2006 | Brankovic et al. |
| 7,593,704 B2 | 9/2009 | Pinel et al. |
| 7,912,449 B2 | 3/2011 | Hansen et al. |
| 7,912,506 B2 | 3/2011 | Lovberg et al. |
| 7,965,837 B2 | 6/2011 | Kawasaki et al. |
| 8,218,427 B2 | 7/2012 | Lee et al. |
| 8,229,352 B2 | 7/2012 | Doan et al. |
| 8,259,647 B2 | 9/2012 | Shao et al. |
| 8,265,657 B2 | 9/2012 | Shao et al. |
| 8,279,784 B2 | 10/2012 | Chiang et al. |
| 8,285,223 B2 | 10/2012 | Unger |
| 8,306,483 B2 | 11/2012 | Park |
| 8,320,877 B2 | 11/2012 | Hansen et al. |
| 8,326,221 B2 | 12/2012 | Dorsey |
| 8,332,495 B2 | 12/2012 | Lancaster et al. |
| 8,345,577 B2 | 1/2013 | Claessen |
| 8,396,042 B2 | 3/2013 | Kim et al. |
| 2003/0098819 A1* | 5/2003 | Sukthankar ............ G09G 3/002 345/1.1 |

(Continued)

*Primary Examiner* — Quoc D Tran
(74) *Attorney, Agent, or Firm* — McGarry Bair PC (57) ABSTRACT

A system for providing access to shared multimedia content within a defined room environment includes a hub and a plurality of remote connection devices. The hub, configured to provide a wireless network having a frequency of 60 GHz and compatible with the IEEE 802.11ad protocol, delivers the wireless network via a plurality of radio transceivers and has at least one local device connection. The local device connection includes an interface to an associated wide area network.

20 Claims, 6 Drawing Sheets

(56) References Cited

U.S. PATENT DOCUMENTS

| | | |
|---|---|---|
| 2005/0078172 A1* | 4/2005 | Harville .............. H04N 7/142 348/14.09 |
| 2005/0135611 A1 | 6/2005 | Hardacker |
| 2005/0176416 A1 | 8/2005 | Desch et al. |
| 2006/0160489 A1 | 7/2006 | Hardacker |
| 2006/0258300 A1 | 11/2006 | Chan et al. |
| 2007/0287498 A1* | 12/2007 | Wang .............. G06Q 10/087 455/556.1 |
| 2009/0156120 A1 | 6/2009 | Rofougaran |
| 2009/0328189 A1 | 12/2009 | Budyta et al. |
| 2010/0046455 A1 | 2/2010 | Wentink et al. |
| 2010/0115145 A1* | 5/2010 | Banerjee .............. G06F 9/4413 710/10 |
| 2010/0302454 A1* | 12/2010 | Epstein .............. H04N 5/268 348/705 |
| 2010/0321402 A1 | 12/2010 | Han et al. |
| 2011/0090942 A1 | 4/2011 | Hardacker et al. |
| 2011/0134852 A1 | 6/2011 | Cordeiro |
| 2012/0082069 A1 | 4/2012 | Rofougaran et al. |
| 2012/0083215 A1 | 4/2012 | Rofougaran et al. |
| 2012/0133727 A1* | 5/2012 | Bolduc .............. H04N 7/152 348/14.07 |
| 2012/0202426 A1 | 8/2012 | Henderson et al. |
| 2012/0278192 A1 | 11/2012 | Shirron et al. |
| 2012/0300759 A1 | 11/2012 | Patanapongpibul et al. |
| 2013/0016079 A1 | 1/2013 | Wang et al. |
| 2013/0029685 A1 | 1/2013 | Moshfeghi |
| 2013/0034184 A1 | 2/2013 | Roh |
| 2013/0044695 A1 | 2/2013 | Xu et al. |
| 2013/0050398 A1* | 2/2013 | Krans .............. H04N 7/142 348/14.07 |
| 2013/0070739 A1 | 3/2013 | McCann et al. |
| 2013/0084796 A1 | 4/2013 | Kerr |
| 2013/0094439 A1 | 4/2013 | Moshfeghi |
| 2015/0035938 A1* | 2/2015 | Emori .............. H04M 3/567 348/14.08 |

* cited by examiner

SYSTEM FOR PROVIDING ACCESS TO SHARED MULTIMEDIA CONTENT

CROSS-REFERENCE TO RELATED APPLICATION

This application claims the benefit of U.S. Provisional Application No. 61/831,423, filed Jun. 5, 2013, U.S. Provisional Application No. 61/842,628, filed Jul. 6, 2013, and U.S. Provisional Application No. 61/842,638, filed Jul. 8, 2013, all of which are incorporated herein by reference in their entirety.

BACKGROUND OF THE INVENTION

Increasingly in the global corporate environment, collaboration, both local and remote, is essential and requires interactivity between participants to a degree beyond the current capabilities of conferencing and teleconferencing technologies. The significance of group ideation and remote collaboration in the corporate environment has made the meeting room ubiquitous. For example, by one estimate, there are approximately 67 million meeting rooms worldwide. Further, the individuals participating in meetings are increasingly reliant on mobile user devices such as smartphones, tablets, laptops, e-readers, etc. to carry digital content.

Issues individuals face within these collaborative meeting environments include the lack of a staple product to display, present, and collaborate around content and the myriad connected adapters such as HDMI, VGA, DisplayPort, MiniDisplayPort, Thunderbolt, USB, etc. necessary to achieve connectivity with user devices. Existing collaborative presentation systems rely on a direct cabled or wired connection connected physically to the users' computers or tablets. Existing wireless presentation systems require software packages to be downloaded to enable laptops or computers to communicate with existing presentation systems. The software packages may force a user device to change the settings and configure the user device for specific formats or applications to be used with the user devices. Individuals or corporate policies are generally averse to downloading unfamiliar software that may change the format of their devices or the characteristics of the content they are sharing in the collaborative environment. Translation software may be needed with tablets and smartphones to format the data being utilized to meet some of the presentation system's throughput requirements. The formatting may enforce undesirable changes on the look and feel of the presented data.

Currently, matrix-switching systems require a hard-wired or cabled/wired connection to reliably transmit and receive the required bandwidth of data to and from the devices connected thereon. In addition, accessing and controlling the peripheral devices connected to typical wired matrix-switching systems requires multiple input devices. That is, currently, no single command and control device can control the data presentation, the matrix-switching and the connected peripheral devices.

While wired connections may be capable of handling the large amount of bandwidth needed to send and receive information between all connected devices in a conferencing environment, corresponding wireless systems do not. Due to the limited bandwidth capabilities of currently available wireless systems, wireless applications cannot handle the amount of two-way information being sent from hard-wired matrix switches to peripheral computing and multimedia devices. That is, conventional wireless technology does not support a broadband signal with the necessary bandwidth requirements to send unbuffered and uncompressed collaborative multimedia data without latent pauses, causing disruption of the ideation, communication or sharing of data and information. For example, wireless systems typically achieve transmission rates of 700 Mbps and are not capable of transmission rates greater than 3 Gbps necessary to maintain uncompressed high-definition video conferencing (HDVC).

Cabling and wired systems create a great deal of installation and life-cycle costs to configure and reconfigure a meeting room (e.g. floor coring or trenching, inserting floor stubs or poke-thru devices, installing shallow-raised or raised flooring, cable trays, behind-wall wireways, etc.). Connecting all peripheral devices to a matrix-switching system requires a large amount of wire that often has to be hidden and trenched to give a clean aesthetic look to the meeting room. Wiring a meeting room is inconvenient and costly; problems compounded when moving or modifying meeting spaces resulting in opening up walls, floors, and ceilings to remove or add wires and cables. The effects are often disruptive and may cause meetings to take longer than necessary.

Currently, wireless connectivity is preferred over wired connectivity within corporations, educational facilities, and other types of organizations. However, currently available wireless presentation systems (e.g. Apple TV, InFocus LiteShow III, Barco Clickshare, etc.) are not collaborative and do not control multiple peripherals simultaneously. These wireless systems are designed for an individual to present or send content or data to a single peripheral device that is solely controlled by the individual. That is, to present a counterpoint during a meeting or presentation by taking over a connected peripheral device, a first individual must surrender control to a second individual; a wireless version of "passing the cord."

Security issues prevent many facilities from using a wireless system for fear that the signal, communication, data, ideation, information, and the like, may be compromised by surveillance outside of the enclosed environment or other wireless security fears. Consequently, many collaborative workspaces default to wired infrastructures with cables and wires for connectivity to insure data and communication security. In today's work environment, where user device technologies allow for individuals and teams to access information and data immediately, a secure wireless environment is necessary for individuals and teams to communicate, share, collaborate and ideate around electronically presented data while simultaneously controlling access to the signal.

BRIEF DESCRIPTION OF THE INVENTION

In one aspect, the invention relates to a system for providing access to shared multimedia content within a defined room environment. The system comprises a hub and a plurality of remote connection devices. The hub, configured to provide a wireless network having a frequency of 60 GHz and compatible with the IEEE 802.11ad protocol, delivers the wireless network via a plurality of radio transceivers and has at least one local device connection, wherein the at least one local device connection includes an interface to an associated wide area network. The hub has a controller which contains a switching logic processor. The plurality of remote connection devices each having at least one radio transceiver are configured to connect to one of the radio transceivers of the hub via a wireless link. Each of the remote connection devices is configured to be connected with at least one of a user device brought into the room environment or a multimedia device located within the room environment. Each of the plurality of remote connection devices is capable of being associated with a user device or a multimedia device and one or more protocols that a connected user device or a connected multimedia device is capable of receiving or transmitting. When the hub is connected to a plurality of remote connection devices by a wireless link, a connected user device or a connected multimedia device can act as a source for transmission of multimedia content to the hub. The hub rebroadcasts the multimedia content from the source to at least some of the other connected remote connection devices which can receive all or a part of the broadcasted multimedia content. When another of the connected remote connection devices issues a control request signal to the hub, the hub then designates another of the connected remote connection devices as the source and broadcasts multimedia content from the newly-indicated source.

DESCRIPTION OF EMBODIMENTS OF THE INVENTION

Figure 1:
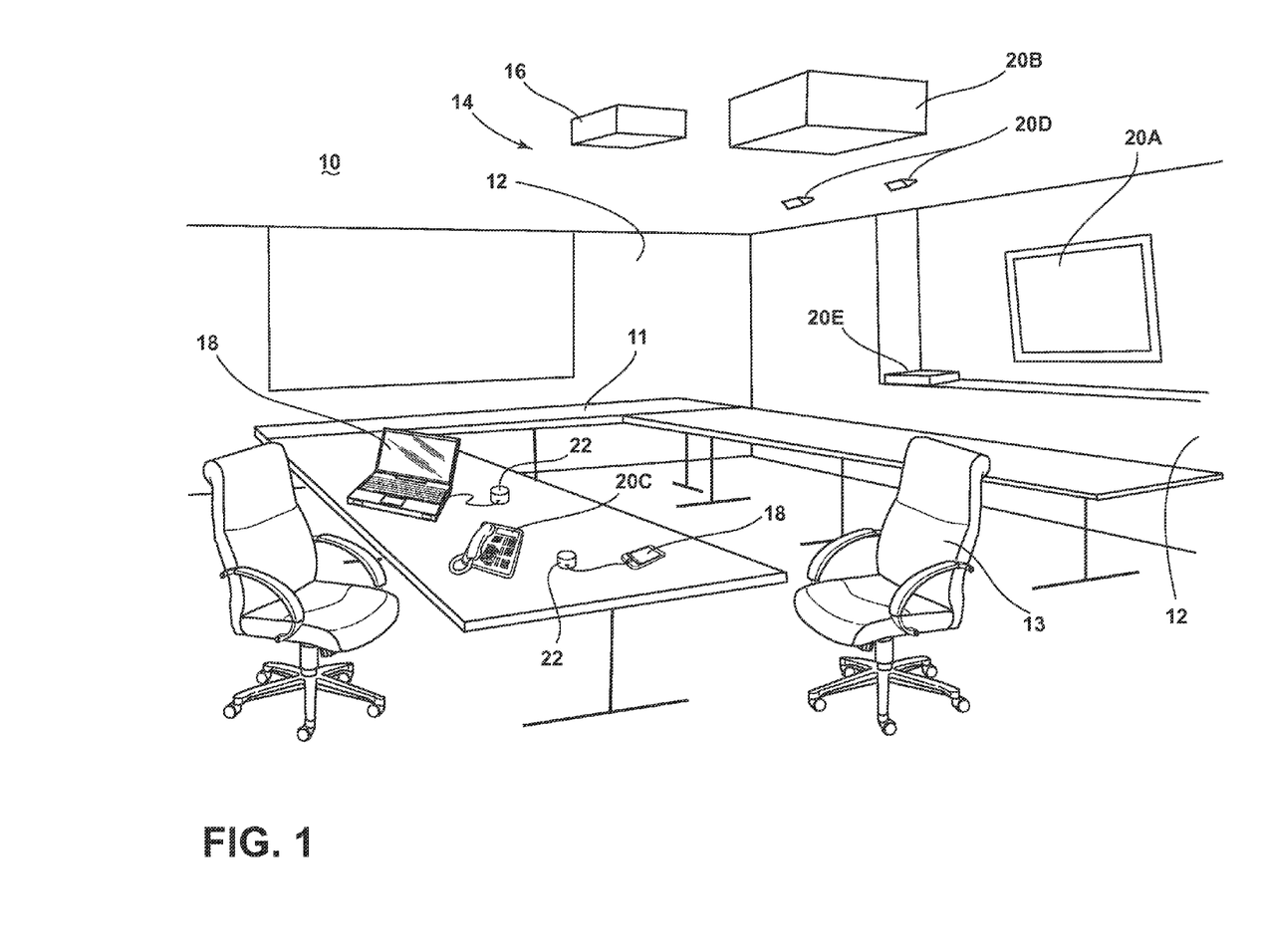
FIG. 1 depicts a meeting room with a system for providing access to shared multimedia content according to an embodiment of the present invention.

Referring now to FIG. 1, a meeting room 10 with a system 14 for providing access to shared multimedia content is shown. The meeting room 10 is bound by a floor, ceiling and walls 12 of which form a defined room environment. Furniture typical to a meeting room include conference tables 11 and chairs 13. A hub 16 is configured to provide a wireless network in the meeting room 10. To enable high-performance collaborative sharing, the wireless network operates over the 60 GHz frequency band and is compatible with 802.11ad protocol. Via the wireless network, the hub 16 communicates shared multimedia content with peripheral devices including user devices 18 and multimedia devices 20 located within the meeting room 10 via one or more remote connection devices 22. The shared multimedia content may include one or more of text, imagery, video, audio, interactive, hypermedia, telephony and combinations thereof.

The user devices 18 are personal portable consumer electronics brought into the meeting room 10 and may include, but not be limited to, a laptop computer, a smartphone, a tablet computing device, a wearable computing device, etc. The multimedia devices 20 located within the meeting room 10 may include, but not be limited to, a television screen 20A, a monitor, a DVD player 20E, a computer, a video playing device, an audio speaker 20D, an amplifier, a projector 20B, a high definition visual communication (HDVC) device, a telephony system 20C, a voice over Internet Protocol (VOIP) system, a camera, an electronic whiteboard, a touchscreen overlay device, a cable set-top box, and a satellite set-top box. It is contemplated that future technologies including holographic projectors, silicon-infused vertical glass walls as monitors or communications devices, and telepresence systems will be packaged as multimedia devices for meeting room environments and include capabilities for connectivity similar to that provided by current multimedia devices.

In a meeting room 10, the hub 16 may be advantageously located to deliver the highest data throughput for the entirety of the peripheral devices. The hub 16 may be suspended from the ceiling of the meeting room or centrally located on a conference table 11 or integrated into an element of the table 11 such as a table leg. The hub 16 is powered with a standard AC/DC power connection, and may additionally include a standard wired ethernet connection and plain old telephone service (POTS).

Figure 2:
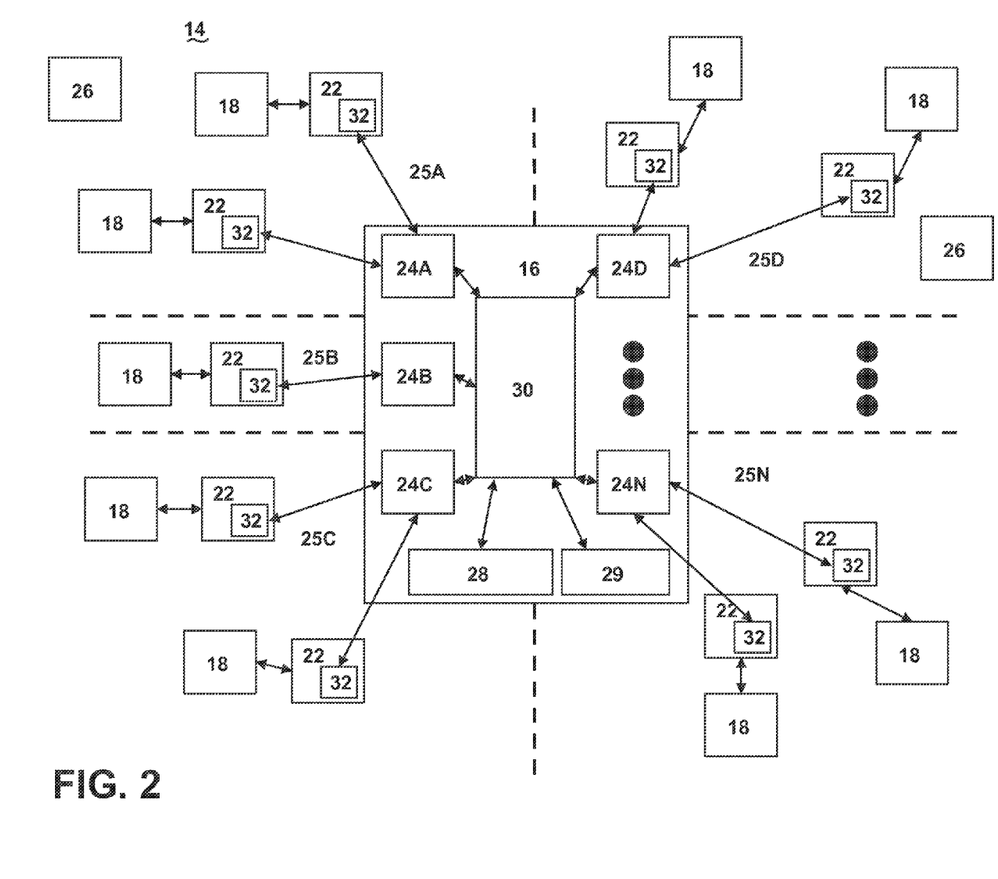
FIG. 2 is a diagram of the system of FIG. 1 illustrating the hub and remote connection devices.

Referring now to FIG. 2, a block diagram of the system 14 is shown. The hub 16 delivers the wireless network via a plurality of radio transceivers 24. The radio transceivers 24 wirelessly transmit and receive electronic communications with the remote connection devices 22. The remote connection devices 22 are each associated with a user device 18 brought into the meeting room or a multimedia device 20 located within the meeting room.

At least one of the radio transceivers 24 is preferably located physically within the housing of the hub 16. Each radio transceiver 24 includes electronic elements for communicating high performance wireless data across a channel in the 60 GHz wireless regime. The electronic elements include wireless transmit and receive electronics including amplifiers and filters, etc. Each radio transceiver 24 includes one or more antenna elements where the antenna elements may support beamforming according to the IEEE 802.11ad protocol for adaptively signaling within the coverage area of the radio transceiver. The hub 16 preferably includes multiple radio transceivers 24. For example, the hub 16 may include four radio transceivers 24 to deliver the wireless network, though the system 14 readily scales upward with the addition of more radios, such as 8 or 16 depending upon the implementation.

Applied to wireless terrestrial applications, the natural attenuation of 60 GHz wirelessly transmitted signals has been viewed as a limitation in the wireless networking industry because of the high absorption of the signal in oxygen and the narrow beamwidth inherent to high frequency transmission. Consequently, the wireless networking industry relies entirely on adaptive beamforming to increase the distance of a transmission. However, the system 14 described herein utilizes multiple (i.e. at least four) 60 GHz radio transceivers 24 within the housing of the hub 16 to take advantage of spatially defined channels within the meeting room space. That is, each radio transceiver 24 may operate a portion of the wireless network where the portion is defined by an area or volume of the meeting room 10. As shown in FIG. 2, the radio transceivers 24A-D and 24N wirelessly transmit and receive in a respective portion 25A-D and 25N of the meeting room 10. In this way, the system 14 takes advantage of the narrow beamwidth properties of the 60 GHz wireless regime such that spatially defined channels may be individually and simultaneously operated in a meeting room 10 at substantially the same operating frequency. In other words, spatially defined channels allow for spectral reuse within the meeting room environment. Configuring the spatially defined channels may, in part, determine the particular placement of the hub 16 in the meeting room 10. That is, the location of the hub 16 may be preferably selected to orient the radio transceivers and associated antennas to advantageously maximize signal strength throughout the room environment.

Additional radio transceivers 26 may be located externally of the housing of the hub 16. The walls of the meeting room 10 may house one or more additional radio transceivers 26, each connected to the hub 16 via a wired or wireless connection depending upon the implementation. The walls may be static, conventional walls but may include moveable elements such as a curtain, etc. In this way, the wall may include a radio transceiver 26 configured to selectively act as a relay and pass communication from the hub 16 into an adjacent room environment where the hub 16 is not physically located. Additional radio transceivers 26 may be located within a piece of furniture located within the defined room environment of the meeting room 10.

The hub 16 includes at least one local device connection 28. The local device connection 28 includes an interface to an associated wide area network. The interface to the associated wide area network may be a direct or indirect connection to the Internet. In this way, the system 14 connects users physically located within the meeting room with sources of data located external to the meeting room that includes audio and video conferencing data indicative of communications with remote collaborators.

The hub 16 includes a controller that contains a switching logic processor 30. The switching logic processor 30 is configured to input multiple different streams of multimedia content. The switching logic processor 30 may split or duplicate the streams, directing multiple output streams. The switching logic processor 30 directs the multiple output streams such that the data is directed to multiple user devices 18 and multimedia device 20 at approximately the same time. That is, the switching logic processor 30 synchronously multiplexes and delivers multimedia content to the radio transceivers 24 for transmission to the peripheral devices connected to the network. In this way, the hub 16 acts as a matrix switcher configured to wirelessly deliver multimedia content. For example, the hub 16 may simultaneously route multiple uncompressed high definition video streams to various multimedia devices 20.

The hub 16 includes a solid-state drive 29 that is shared to all currently-connected remote connection devices 22. In this way, each user device 18 connected on the wireless network may share files and other multimedia content between connected user devices 18. Upon disconnection of a user device 18 from the wireless network, the hub 16 may delete any shared files.

Each of the remote connection devices 22 includes at least one radio transceiver 32. Each of the radio transceivers on the remote connection devices 22 is configured to connect to one of the radio transceivers 24 of the hub 16 via a wireless link. Each of the remote connection devices 22 is configured to be connected with the peripheral devices, including one or more user devices 18 brought into the room environment or a multimedia device 20 located within the room environment. The remote connection devices 22 are each configured to be connected with the peripheral devices located within the room environment via a wired or a wireless connection.

Each of remote connection devices 22 are capable of being associated with a user device 18 or a multimedia device 20 by one or more wired or wireless protocols. The selection of the protocol depends on the protocols that the particular user device 18 or multimedia device 20 are capable of receiving and/or transmitting.

The hub 16 is connected to the remote connection devices 22 by a wireless link according to the IEEE 802.11ad protocol. A connected user device 18 or a multimedia device 20 may act as a source for transmission of multimedia content to the hub 16. The hub 16 rebroadcasts the multimedia content from the source to at least some of the other connected remote connection devices 22. Each connected remote connection device 22 may receive all or a part of the broadcasted multimedia content. When another of the connected remote connection devices 22 issues a control request signal to the hub 16, the hub 16 may then designate another of the connected remote connection devices 22 as the source. The hub 16 may then broadcast multimedia content transmitted from the newly-indicated source. When a user device 18 or a multimedia device 20 has a compatible wireless networking interface resident thereon, the hub 16 is configured to receive connections directly with the user device 18 or multimedia device 20 without an intervening remote connection device 22.

Figure 3:
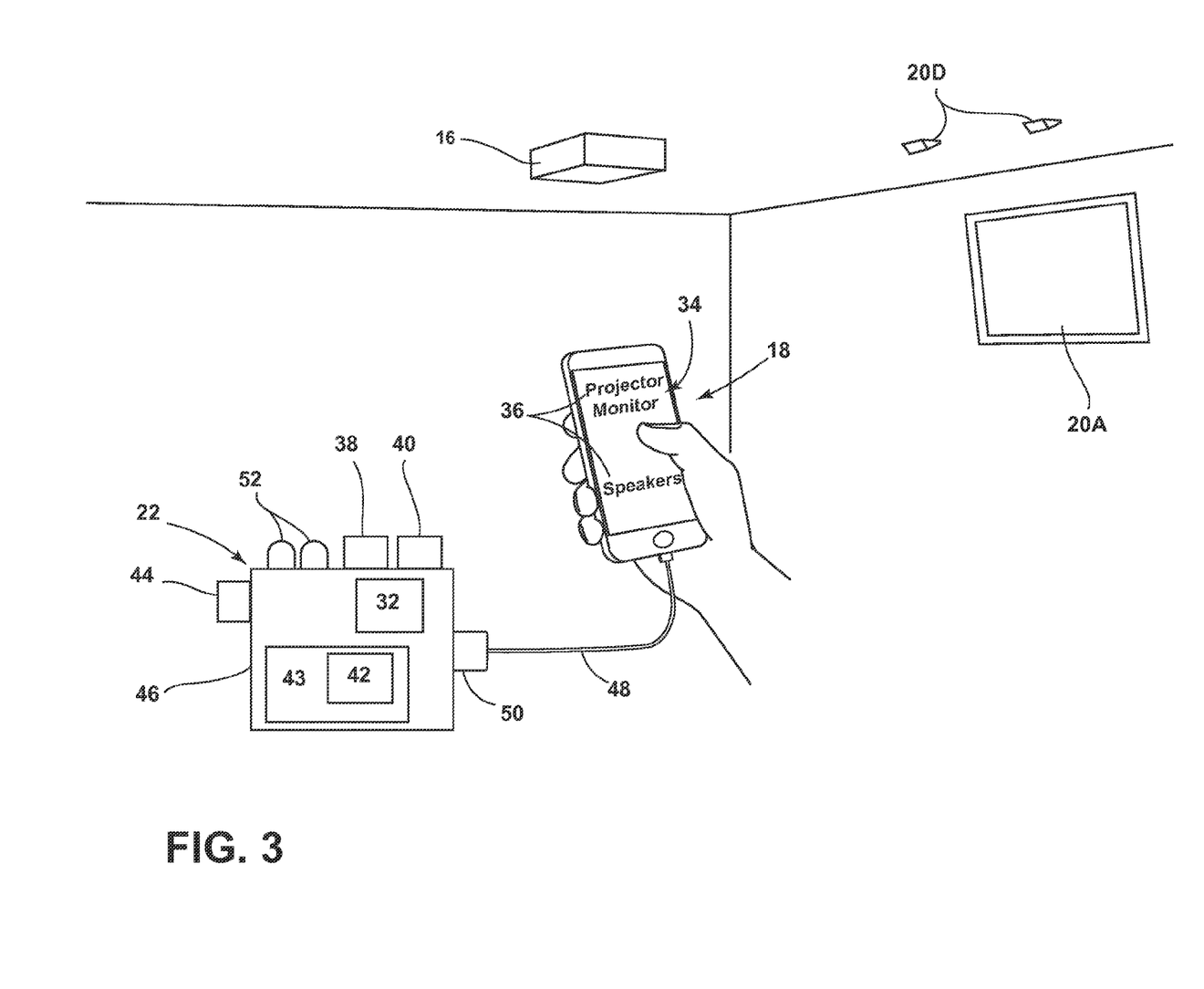
FIG. 3 illustrates a remote connection device and an application for selectively controlling the system for shared multimedia content.

Referring now to FIG. 3, a remote connection device 22 and an application for selectively controlling the system for shared multimedia content is illustrated. The remote connection device 22 includes at least one 60 GHz transceiver 32 electrically coupled to a processor 42 disposed on a printed circuit board (PCB) 43 and input/output (I/O) ports 44. A housing 46 sealing the electrical components therein may be plastic, molded rubber, ceramic, aluminum or any material or combination of materials used for electronics housings. For hard-wired connections to a user device 18, the remote connection device 22 may include a tether 48. The tether 48 may include one or more ports 50 for standard electrical connectors and may include compatibility with, for example, a DisplayPort, an HDMI port, a USB port, etc. Disposed on the housing 46, display elements may include LED-based OLED/AMOLED diodes 52, a touch screen or other display technologies.

A software application resides on the hub 16 which may only be accessed by a designated source remote connection device 22. Using the software application transmitted by the hub 16, the designated source remote connection device 22 may control one or more of the multimedia devices 20 located in the environment of the meeting room 10. The software application allows for a command and control menu of the hub 16 to be sent via the wireless network to a user device 18 connected to the source remote connection device 22. By manipulation of the command and control menu, a user device 18 controls the multimedia devices 20 to create a unified audio/visual presentation of multimedia content. The user device 18 wirelessly transmits content to the peripheral devices wirelessly connected via the 60 GHz wireless network. In this way, an individual in the meeting room may control the connected multimedia devices through the display interface on their user device 18 to selectively share multimedia content.

In practice, when a collaborative team enters the meeting room, each individual obtains a remote connection device 22 and connects it to their user devices 18 by either a wireless connection (e.g. WiFi, NFC, Bluetooth, IR, 60 GHz WiGig, etc.) or by a tethered wired connection (i.e. a high speed serial connection like USB) depending upon the capabilities of the particular user device 18. The designated source remote connection device 22, when connected to a user device 18 generates a menu 34 on the user device 18 allowing for the direct control of the peripheral devices connected to the hub 16 through the 60 GHz wireless network. The designated source remote connection 22 transmits multimedia content stored directly on and from the user device 18 to the hub 16 and then to one or more selected multimedia devices 20 by selecting indicia 36 corresponding to the multimedia devices 20. For example, selection of indicia on the menu 34 of the user device 18 corresponding to a television screen 20A or whiteboard directs the multimedia content to the corresponding multimedia devices 20. The switching logic processor in the hub 16 then selectively multiplexes the multimedia content to direct, for example, the graphical or video data to television screen 20A, an electronic whiteboard or monitor and the audio data to speakers 20. In this way, multimedia content may be shared with any combination of multimedia devices 20 and user devices 18 in the meeting room. Additionally, when the multimedia content includes telephony, video and audio data relating to a conference call may be directed to appropriate multimedia devices 20 including a monitor and speakers 20D.

While the menu 34 and corresponding controls may include virtual buttons displayed on a display of a user device 18, the remote connection device 22 may include additional controls in the form of hardwired buttons. The remote connection device 22 may include a "Go" button 38 to initiate and execute the transmission of multimedia content stored on the user device 18 to the hub 16, that, in turn, broadcasts to the corresponding multimedia devices 20. The remote connection device 22 may include a "Menu" button 40. The actuation of the "Menu" button 40 initiates the selection of the indicia corresponding to multimedia devices 20 to which multimedia content is to be transmitted.

Other elements of the user interface of the remote connection device 22 may include visual feedback to confirm connectivity with a user device 18. That is, when the remote connection device 22 wirelessly pairs with a user device 18, the remote connection device 22 may include, for example, a lighted display element 52 that glows blue to convey a successful connection to the user device 18. As the user selects indicia 36 of available multimedia devices 20 with which to transmit multimedia content, a lighted display element 52 may glow red to convey a successful connection.

Due to inherent properties of the 60 GHz frequency of the wireless network operating in a closed environment of a meeting room 10, the system 14 also creates a secure wireless environment. Put simply, unless an individual is in the meeting room environment, they cannot access the wireless network of the meeting room.

The natural attenuation of the 60 GHz frequency of the wireless network, which is also referred to as a millimeter wave frequency, may be absorbed into the atmosphere after distances of approximately 50 to 60 feet. The wavelength of the radio transmission of the wireless network is approximately 5 mm. Consequently, the transmissions, unlike longer wavelength WiFi signals (e.g. 2.4 GHz UHF and 5 GHz SHF bands), do not readily penetrate architectural components like walls. Specifically, the 60 GHz wireless network does not penetrate the common materials such as metal, glass, wood, drywall, and the like that typically make up architectural components. Additionally, the high frequency enables high digital data rates; resulting in a preferred wireless network in secure conference, collaborative, and teaming spaces. When paired with architectural components that make up an enclosed room such as walls, floors, ceiling, moveable walls, doors, windows, reconfigurable walls, partition walls, and the like, the signal may not be able to penetrate outside of the environment created, which in turn creates a de-facto secure wireless space. In this way, the meeting room and its architectural components therein create a "natural Faraday cage" to enable the creation of a secure wireless environment within the enclosed meeting room environment. In contrast to existing wireless technologies, auxiliary technologies or devices are not required to mask or block the transmittal signal within the enclosed environment.

Figure 4:
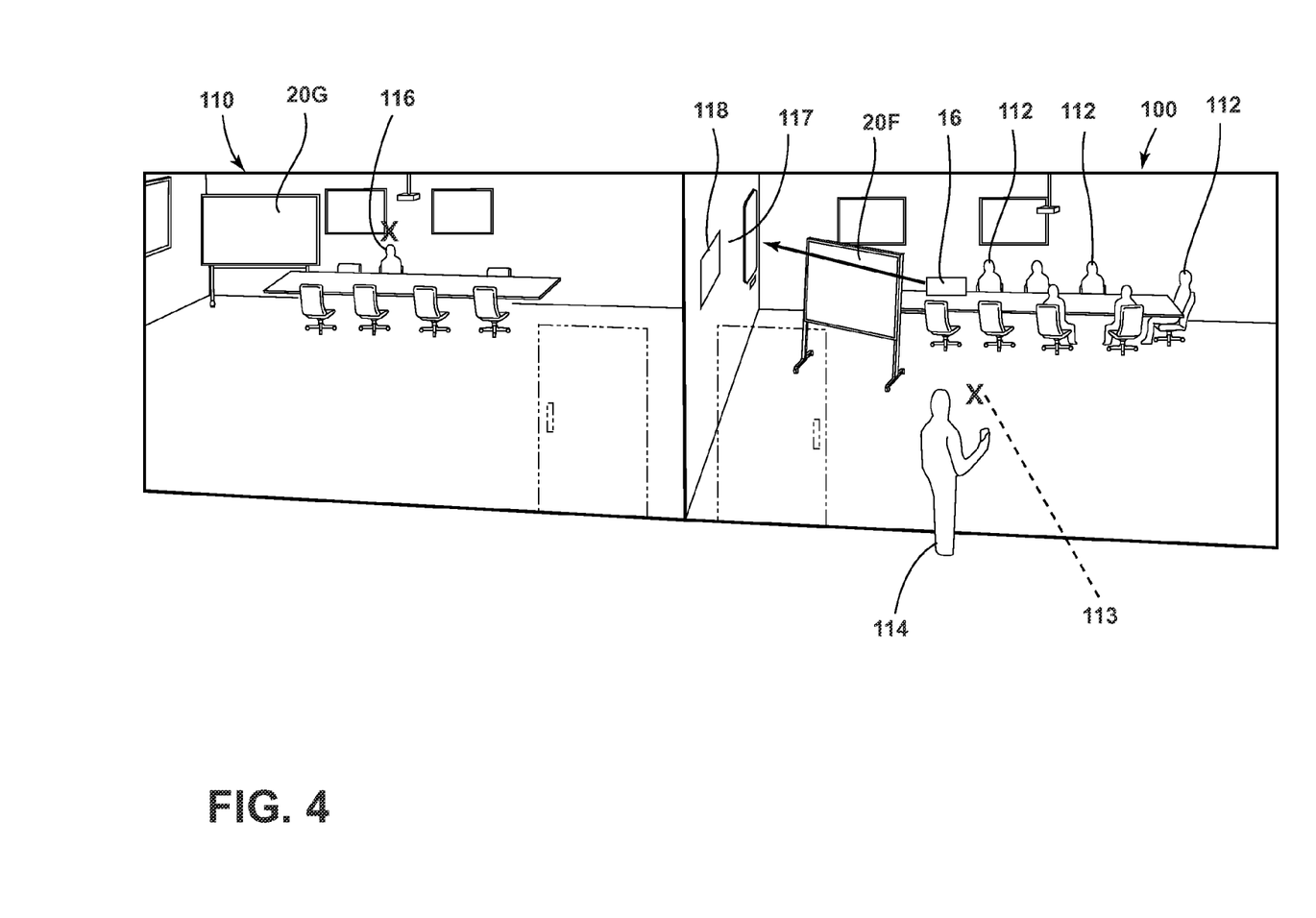
FIG. 4 illustrates a secure meeting environment where the size and shape of the environment is reconfigurable.

FIG. 4 illustrates a secure meeting environment where the size and shape of the environment is reconfigurable. In a first meeting room 100 configured with a hub 16, the participants 112 inside the room 100 may collaborate sharing content as described above. For example, data on a user device may be displayed on an electronic whiteboard 20F. An individual 114 outside the meeting room 100 in an adjacent hallway is not able to surveil the electronic data of the 60 GHz wireless network because of the intervening wall structure 113. Similarly, an individual 116 in an adjacent meeting room 110 is not able to surveil the data due to the intervening wall structure 117.

The intervening wall structure 117 between the meeting rooms may include an element that includes a radio transceiver 118 for connecting to the hub 16. The wall structure 117 may include a selectively moveable element such as a curtain or shade. When moved to an open position, the wall element 118 acts as a relay configured to pass communication from the hub into an adjacent room environment such as the second meeting room 110 where the hub 16 is not located. The user devices and multimedia devices in the second meeting room 110 such as an electronic whiteboard 20G are now elements of the system for sharing multimedia content. In this way, the individual 116 in the second meeting room 110 may share content with those individuals 112 in the first meeting room 100 while preserving the secure environment preventing eavesdropping by the individual 114 outside the now reconfigured meeting room that includes the first and second meeting rooms 110, 112.

Figure 5:
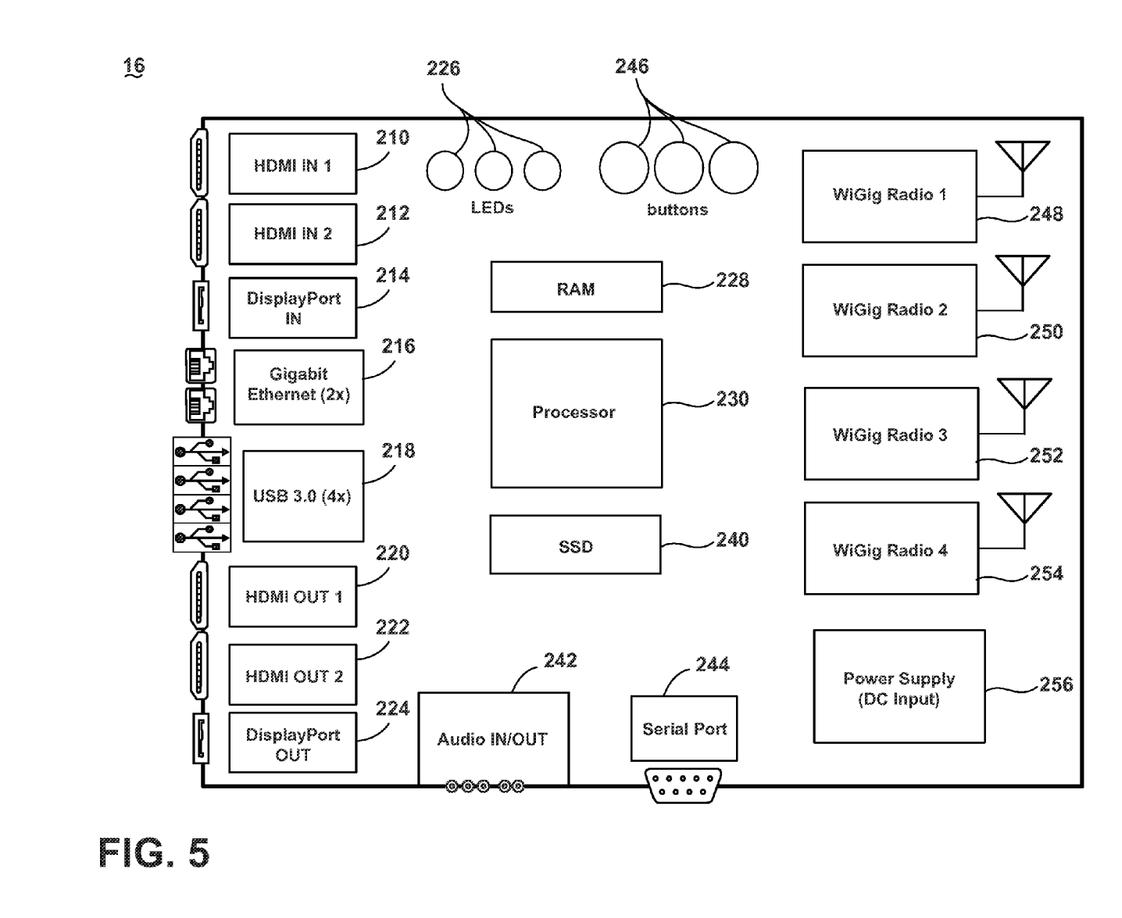
FIG. 5 illustrates a block diagram of a hub according to an embodiment.

Referring now to FIG. 5, a block diagram of a hub according to an embodiment is shown. As described above, the hub 16 is the central device to the system and connects wirelessly to the remote connection devices. In one embodiment, the hub 16 includes multiple separate HDMI inputs 210, 212. The HDMI inputs 210, 212 include input circuitry that, in conjunction with the hub's processor 230, convert the input signals to a digital format compatible for transfer to other components of the system. While HDMI is currently the most common type of high definition video connector available, the hub 16 also includes additional high definition video inputs. For example, the hub 16 may include a DisplayPort input 214. As with the HDMI inputs 210, 212, the DisplayPort input 214 includes input circuitry, that in conjunction with the hub's processor 230, converts the input signal to a digital format compatible for transfer to the other components of the system. The hub 16 may include multiple gigabit Ethernet connections 216. The hub 16 includes multiple high definition outputs as well. As shown, the hub 16 includes two HDMI outputs 220, 222 that may be configured to output identical duplicate signals or two different independent signals. Similarly, the hub 16 includes at least one DisplayPort output 224.

The hub 16 may include multiple serial connections. As shown, the hub 16 includes four USB 3.0 ports 218 for connecting to external devices. The four USB 3.0 ports 218 include circuitry for compatibility to legacy USB 2.0 and USB 1.0 devices such as a keyboard, a mouse, a video camera, etc. The hub 16 may also include a serial port connection 244. Some conference calling equipment and many legacy electronic devices include serial port connectivity.

The hub 16 may include audio input and output ports 242. The audio input and output ports 242 may include one or more connections for TRS, TRS micro-jack, XLR male, XLR female, microphone mini-jack, headphone mini-jack, TOSLINK optical, RCA, coaxial, MIDI, etc.

The processor 230 controls the operations of the hub 16 and includes execution of an operating system for the hub 16. The operating system may be commercial-off-the-shelf, open source, bespoke or combinations thereof. The processor 230 includes capabilities for handling large data rates, including multiple simultaneous, uncompressed high-definition video streams. The processor 230 includes connectivity to random access memory (RAM) 228 which is rated to a size and speed to accommodate the most severe data loads handled by the processor 230.

The hub 16 includes a solid-state drive (SSD) 240. The SSD 240 stores both the software to run the processor 230 and provide data storage space for users of the system.

The hub 16 includes a power supply 256 to provide power. The hub 16 is mains powered. Consequently, the power supply 256 includes an external UL certified AC/DC convertor accepting standard 120 VAC mains power.

As described above, the hub 16 may include multiple radio transceivers. As shown in FIG. 5, the hub may include four radio transceivers 248, 250, 252, 254. The radio transceivers 248, 250, 252, 254 may be 802.11ad/WiGig radios that operate in the unlicensed 60 GHz frequency band. The radios may include electronics and antenna elements for implementing a beamforming strategy and may be placed advantageously in the hub 16 to create the spatial channels described above. To ensure sufficient bandwidth for multiple signals, all four radio transceivers 248, 250, 252, 254 configured in the 802.11ad protocol must be available in the system. Consequently, the hub 16 as shown in FIG. 5 includes the four complete radios configured to operate simultaneously.

The hub 16 includes display elements such as LEDs 226 and buttons 246 to provide a human-machine interface (HMI). In this way, an operator of the hub 16 may receive visual feedback pertaining to the status of the hub 16 via the LEDs 226 and initiate instructions for execution of the features of the hub 16 via the buttons 246.

Figure 6:
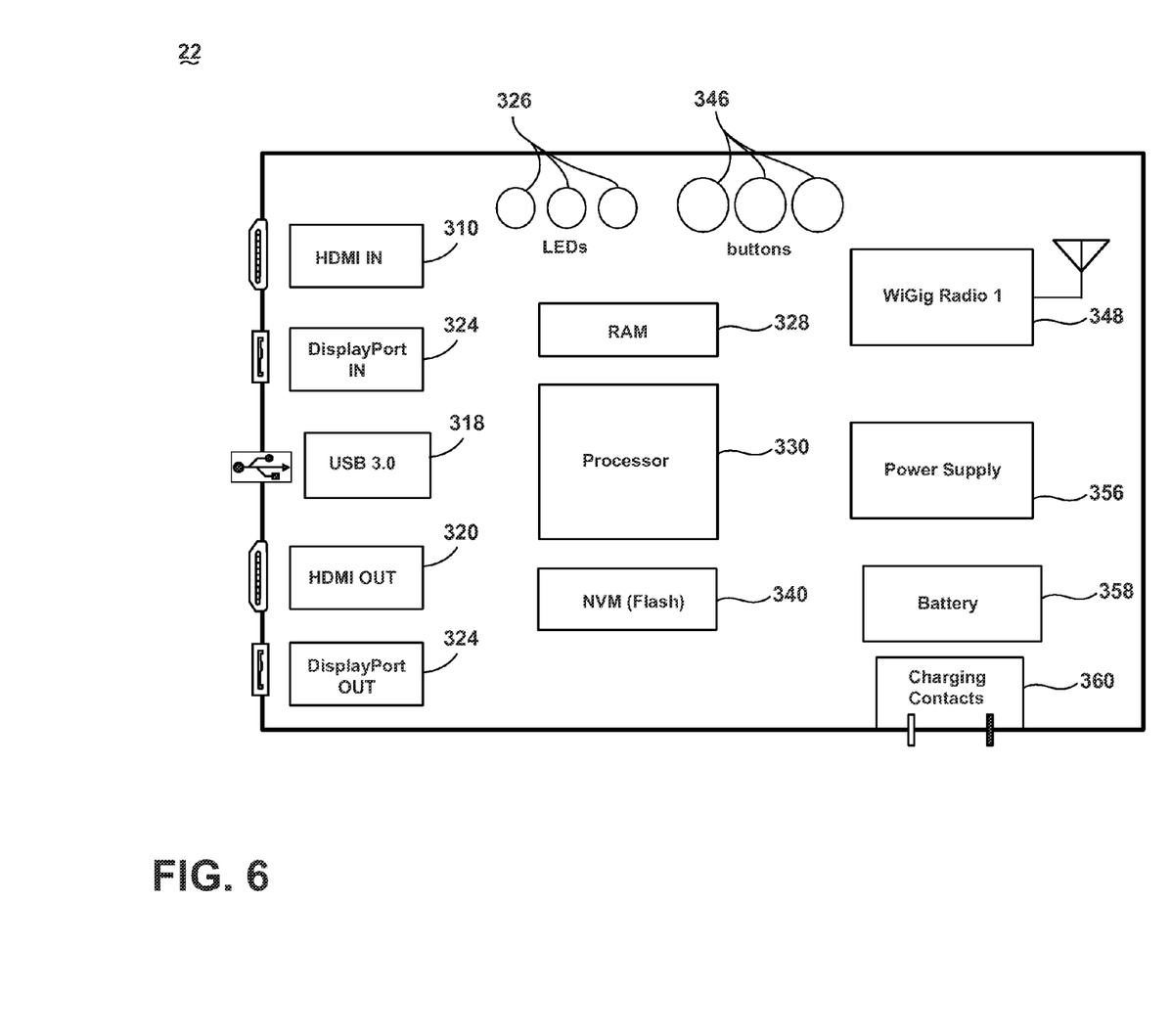
FIG. 6 illustrates a block diagram of a remote connection device according to an embodiment.

Referring now to FIG. 6, a block diagram of a remote connection device 22 according to an embodiment is shown. Each remote connection device 22 includes a single radio transceiver 348 to communicate to the hub 16 on any available wireless (e.g. WiGig) channel. The radio transceiver supports a data throughput of at least 7 Gbps. The radio transceiver 348 includes an antenna array capable of beamforming to control the directionality of the output wireless transmission and reception.

The remote connection device 22 includes a processor 330 to manage the electronic components contained therein and connected thereon. The processor 330 includes capabilities for execution of an operating system. The operating system may be commercial-off-the-shelf, open source, bespoke or combinations thereof. The processor 230 also includes capabilities for converting received data streams into HDMI-compatible formats. The processor 230 includes connections to onboard RAM 328 and non-volatile memory or flash 340 to support the execution of the operating system and general purpose processing including the formatting of the digital data.

The remote connection device 22 includes at least one HDMI input 310. The HDMI input 310 includes input circuitry that, in conjunction with the remote connection device's processor 330, converts the input signal to a digital format compatible for transfer to other components of the system. The remote connection device 22 also includes additional high definition video inputs. For example, the remote connection device 22 may include a DisplayPort input 314. As with the HDMI input 310, the DisplayPort input 314 includes input circuitry, that in conjunction with the remote connection device's processor 330, converts the input signal to a digital format compatible for transfer to the other components of the system. The remote connection device 22 includes multiple high definition outputs as well. As shown, the remote connection device 22 includes one HDMI output 320 and one DisplayPort output 324.

The remote connection device 22 includes display elements such as LEDs 326 and buttons 346 to provide a human-machine interface (HMI). In this way, an operator of the remote connection device 22 may receive visual feedback pertaining to the status of the remote connection device 22 via the LEDs 326 and initiate instructions for execution of the features of the remote connection device 22 via the buttons 346.

The remote connection device 22 may include a power supply 256. The power supply 256 may include an internal UL-certified AC/DC convertor accepting standard 120 VAC mains power. The remote connection device 22 may also include a battery 358 for power when no external power source is readily available. The remote connection device 22 may include a pair of charging contacts 360 to connect to external power and to charge the internal battery 358.

For a wired, tethered connection to a user device and acts as a tether, the remote connection device 22 may include a serial connector such as a USB 3.0 connection 318.

While described above in the context of a conference room, the defined room environment is not limited to corporate meeting space. The system for sharing multimedia content is applicable to educational and conference spaces. That is, the defined room environment may include classrooms and conference halls where ideation for the purposes of teaching increasingly relies on multimedia content and access to distributed digital data. Additionally, the room environment may be defined by consumer living spaces such as living rooms, kitchens, home offices and any living space where consumers consume multimedia content. For example, the hub, as described above, may connect satellite or cable set-top boxes to consumers' televisions and home entertainment systems as well as personal electronic devices such as smartphones and tablets. In this way, the system delivers streamed multimedia seamlessly and wirelessly to the plethora of home consumer electronics throughout private domestic living spaces as well as corporate and public spaces.

Benefits of the system for providing access to shared multimedia described above include the reduction and/or removal of the wiring and cabling that is both tedious and expensive to install and maintain. Additionally, the system eliminates the need to download presentation software and/or translation software as well as eliminating the multiple remote control devices (e.g. infrared (IR), near-field communication (NFC), Bluetooth etc.) necessary to conventionally control the multimedia devices in a meeting room. By supplying an environment with a single standard for connectivity, the system enables new and legacy user devices to connect and control any of the connected peripherals in the meeting room environment to seamlessly share data and communicative technologies. The system eliminates the need for multiple input-based devices to command and control the various systems used in the modern teaming and conferencing environments. The wireless matrix switching hub of the system processes large amounts of data without latent pauses.

The wireless aspect of the system allows for teaming and moveable tables and other custom collaborative furniture to operate as designed. Conventional wired technology tethers the furniture and the confines of the meeting room environment, enforcing predesigned footprints when sharing multimedia content due to the physical constraints of hard-wired connections. However, the system described above may replace most if not all the hard-wired connections by a wireless 60 GHz pathway to let users share content and enable custom and on-the-fly reconfiguration of the room environment including tables or other furniture and even the walls.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for providing access to shared multimedia content within a defined room environment comprising:
a hub configured to provide a wireless network having a frequency of 60 GHz and compatible with the IEEE 802.11ad protocol, the hub delivering the wireless network via a plurality of radio transceivers, and having at least one local device connection, wherein the at least one local device connection includes an interface to an associated wide area network, the hub having a controller which contains a switching logic processor;
a plurality of remote connection devices each having at least one radio transceiver, configured to connect to one of the radio transceivers of the hub via a wireless link, each of the remote connection devices configured to be connected with at least one of a user device brought into the room environment or a multimedia device located within the room environment, each of the plurality of remote connection devices capable of being associated with a user device or a multimedia device and one or more protocols that a connected a user device or a multimedia device is capable of receiving or transmitting;
wherein, when the hub is connected to a plurality of remote connection devices by a wireless link, a connected a user device or a multimedia device can act as a source for transmission of multimedia content to the hub, wherein the hub rebroadcasts the multimedia content from the source to at least some of the other connected remote connection devices which can receive all or a part of the broadcasted multimedia content, and wherein when another of the connected remote connection devices issues a control request signal to the hub, the hub then designates the another of the connected remote connection devices as the source and broadcasts multimedia content from the newly-indicated source.

2. The system of claim 1 wherein the interface to an associated wide area network comprises a direct or indirect connection to the Internet.

3. The system of claim 1 wherein at least one of the plurality of radio transceivers is located physically within a housing for the hub.

4. The system of claim 1 wherein at least one of the plurality of radio transceivers is located externally of a housing for the hub, and connected to the hub via a wired connection.

5. The system of claim 4 wherein at least one of the plurality of radio transceivers is located within a piece of furniture within the defined room environment.

6. The system of claim 1 wherein the user device brought into the room environment comprises a laptop computer, a smartphone, a tablet computing device, or a wearable computing device.

7. The system of claim 1 wherein a multimedia device located within the room environment comprises a television screen, a monitor, a DVD player, a computer, a video playing device, an audio speaker, a projector, a high definition visual communication (HDVC) device, a telephony system, a voice over Internet Protocol (VOIP) system, a camera, an electronic whiteboard, a touchscreen overlay device, a cable set-top box, and a satellite set-top box.

8. The system of claim 1 wherein the plurality of remote connection devices are each configured to be connected with the at least one of a user device or the multimedia device located within the room environment via a wired or a wireless connection.

9. The system of claim 8 wherein the wireless connection between the remote connection device and the user device or the multimedia device comprises a 60 GHz wireless connection.

10. The system of claim 1 wherein the hub delivers the wireless network via four radio transceivers.

11. The system of claim 1 and further comprising a software application resident on the hub which can only be accessed by a designated source remote connection device for control of one or more of the multimedia devices located in the room environment.

12. The system of claim 1 and further comprising a software application transmitted by the hub to a designated source remote connection device for control of one or more of the multimedia devices located in the room environment.

13. The system of claim 1 wherein the hub further comprises a solid-state drive which is shared to all currently-connected remote connection devices which are connected to a user device on the wireless network for sharing files and other content between connected user devices.

14. The system of claim 13 wherein any shared files are deleted by the hub upon disconnection of a user device from the wireless network.

15. The system of claim 1 wherein the hub is configured to receive connections directly with user devices brought into the room environment when the user device has a compatible wireless networking interface resident thereon.

16. The system of claim 1 wherein the room environment comprises at least one wall element having at least one radio transceiver connected to the hub.

17. The system of claim 16 wherein the at least one wall element comprises a moveable curtain.

18. The system of claim 16 wherein the at least one wall element includes at least one relay configured to pass communication from the hub into an adjacent room environment where the hub is not physically located.

19. The system of claim 1 wherein the shared multimedia content comprises text, imagery, video, audio, interactive, hypermedia, telephony and combinations thereof.

20. The system of claim 1 wherein the shared multimedia content comprises more than one uncompressed high definition video stream.

* * * * *